(12) United States Patent
Chevalley et al.

(10) Patent No.: US 12,467,199 B2
(45) Date of Patent: Nov. 11, 2025

(54) DOUBLE-LAYER MULTI-STRAND CABLE HAVING IMPROVED BENDING ENDURANCE

(71) Applicant: COMPAGNIE GENERALE DES ETABLISSEMENTS MICHELIN, Clermont-Ferrand (FR)

(72) Inventors: Marianna Chevalley, Clermont-Ferrand (FR); Romain Barbat, Clermont-Ferrand (FR); Alexandre Gianetti, Clermont-Ferrand (FR); Stephane Laurent, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 455 days.

(21) Appl. No.: 18/012,327

(22) PCT Filed: Jun. 18, 2021

(86) PCT No.: PCT/FR2021/051104
§ 371 (c)(1),
(2) Date: Dec. 22, 2022

(87) PCT Pub. No.: WO2021/260302
PCT Pub. Date: Dec. 30, 2021

(65) Prior Publication Data
US 2023/0250580 A1    Aug. 10, 2023

(30) Foreign Application Priority Data
Jun. 24, 2020 (FR) ....................... 2006604

(51) Int. Cl.
*D07B 1/06*     (2006.01)
*B60C 9/00*     (2006.01)
*B60C 9/04*     (2006.01)

(52) U.S. Cl.
CPC .......... *D07B 1/0613* (2013.01); *B60C 9/0007* (2013.01); *D07B 1/0633* (2013.01);
(Continued)

(58) Field of Classification Search
CPC .. B60C 9/0007; D07B 1/0613; D07B 1/0633; D07B 1/0673
See application file for complete search history.

(56) References Cited

U.S. PATENT DOCUMENTS 4,265,291 A   5/1981   Pommier
4,274,464 A   6/1981   Pommier
(Continued)

FOREIGN PATENT DOCUMENTS

DE   2755667 A1   6/1979
FR   2419181 A1   10/1979
(Continued)

OTHER PUBLICATIONS

International Search Report dated Sep. 3, 2021, in corresponding PCT/FR2021/051104 (4 pages).
Copending U.S. Appl. No. 18/012,286, filed Jun. 18, 2021.

*Primary Examiner* — Robert C Dye
(74) *Attorney, Agent, or Firm* — VENABLE LLP

(57) ABSTRACT

A multi-strand cord (50) comprises an internal layer (CI) of the cord made up of K=1 three-layer (C1, C2, C3) internal strand (TI), with the internal layer (C1) being made up of Q internal metallic threads (F1), the intermediate layer (C2) being made up of M intermediate metallic threads (F2) and the external layer (C3) being made up of N external metallic (Continued)

threads (F3), and an external layer (CE) of the cord made up of L>1 three-layer (C1', C2', C3') external strands (TE) wound around the internal layer (CI) of the cord, with the internal layer (C1') being made up of Q' internal metallic threads (F1'), the intermediate layer (C2') being made up of M' intermediate metallic threads (F2') and the external layer (C3') being made up of N' external metallic threads (F3'). The cord (50) has an endurance criterion SL≤40 000 MPa·mm with $$SL = \max\left(\frac{\Delta\sigma_{bending\_CI}}{Cp}; \frac{\Delta\sigma_{bending\_CE}}{C_r \times Cp}\right);$$

and a size criterion Ec≥0.46 with Ec=Sc/Se.

15 Claims, 8 Drawing Sheets

(52) U.S. Cl.
CPC ............. *B60C 2009/0425* (2013.01); *B60C 2009/0466* (2013.01); *D07B 2201/1044* (2013.01); *D07B 2201/2025* (2013.01); *D07B 2201/2059* (2013.01); *D07B 2201/2061* (2013.01); *D07B 2205/3025* (2013.01); *D07B 2401/206* (2013.01); *D07B 2401/208* (2013.01); *D07B 2501/2046* (2013.01)

(56) References Cited

U.S. PATENT DOCUMENTS

| | | | |
|---|---|---|---|
| 5,461,850 A * | 10/1995 | Bruyneel | D07B 1/0613 57/902 |
| 8,899,007 B2 * | 12/2014 | Cheng | D07B 1/0613 57/237 |
| 11,319,666 B2 | 5/2022 | Clement et al. | |
| 11,346,049 B2 | 5/2022 | Clement et al. | |
| 11,401,656 B2 | 8/2022 | Clement et al. | |
| 11,458,772 B2 | 10/2022 | Clement et al. | |
| 11,535,982 B2 | 12/2022 | Clement et al. | |
| 11,578,459 B1 | 2/2023 | Clement et al. | |
| 11,591,750 B2 | 2/2023 | Clement et al. | |
| 2015/0217602 A1 | 8/2015 | Salgues et al. | |
| 2019/0225018 A1 | 7/2019 | Nozaki | |
| 2020/0055341 A1 | 2/2020 | Obana et al. | |
| 2020/0131699 A1 * | 4/2020 | Obana | C25D 7/06 |
| 2020/0131700 A1 | 4/2020 | Obana et al. | |
| 2021/0102336 A1 | 4/2021 | Clement et al. | |
| 2021/0188006 A1 | 6/2021 | Takubo | |
| 2021/0316570 A1 | 10/2021 | Ando | |
| 2021/0394560 A1 | 12/2021 | Shizuku | |
| 2022/0412000 A1 | 12/2022 | Chevalley et al. | |

FOREIGN PATENT DOCUMENTS

| | | | |
|---|---|---|---|
| FR | 2419182 A1 | 10/1979 | |
| FR | 3060617 A1 * | 6/2018 | ........... D07B 1/0613 |
| JP | 10-131066 A | 5/1998 | |
| JP | 2001-114143 A | 4/2001 | |
| JP | 2009-52177 A | 3/2009 | |
| WO | 2015090921 A1 | 6/2015 | |
| WO | WO-2015090920 A1 * | 6/2015 | ........... B60C 9/0007 |
| WO | 2019/122721 A1 | 6/2019 | |
| WO | WO-2019243692 A1 * | 12/2019 | ........... B60C 9/0007 |

* cited by examiner

DOUBLE-LAYER MULTI-STRAND CABLE HAVING IMPROVED BENDING ENDURANCE

BACKGROUND

The invention relates to cords, a reinforced product of the non-pneumatic tyre type, a conveyor belt or a caterpillar track and a tyre comprising these cords.

A tyre for a construction plant vehicle, having a radial carcass reinforcement comprising a tread, two inextensible beads, two sidewalls connecting the beads to the tread and a crown reinforcement, disposed circumferentially between the carcass reinforcement and the tread, is known from the prior art. This crown reinforcement comprises a plurality of plies reinforced by reinforcing elements such as metal cords, the cords of one ply being embedded in an elastomer matrix of the ply.

The crown reinforcement comprises a working reinforcement, a protective reinforcement and possibly further reinforcements, for example a hoop reinforcement.

The carcass reinforcement comprises, for its part, at least one elastomer ply, called carcass ply, reinforced by reinforcing elements such as metal cords. A carcass ply reinforcing element comprising a two-layer multi-strand metal cord of structure 189.23 is known from the prior art. This cord comprises an internal layer of the cord made up of an internal strand and an external layer of the cord made up of six external strands wound in a helix around the internal layer of the cord. Each internal strand comprises an internal layer of the strand made up of three internal threads, an intermediate layer of the strand made up of nine intermediate threads and an external layer of the strand made up of fifteen external threads. Each thread has a diameter equal to 0.23 mm. Each external strand comprises an internal layer of the strand made up of three internal threads, an intermediate layer of the strand made up of nine intermediate threads and an external layer of the strand made up of fifteen external threads. Each thread has a diameter equal to 0.23 mm.

A tyre of a heavy-duty industrial vehicle, notably of construction plant type, is subjected to numerous attacks. Specifically, this type of tyre usually runs on an uneven road surface, sometimes resulting in perforations of the tread. These perforations allow the entry of corrosive agents, for example air and water, which oxidize the metallic reinforcing elements of the crown reinforcement and sometimes of the carcass reinforcement, and this considerably reduces the life of the tyre.

Regarding the carcass reinforcement, the inventors behind the invention have identified that the major need for the carcass reinforcement is endurance under a high load; it is therefore important to design cords with a high level of force at break, low bending stiffness and very good penetration by the elastomer compound.

However, cords of the prior art are known to be not very penetrable by the elastomer compound, and this makes them less durable in a corrosive environment. One solution for increasing the life of the tyre is to combat the action of the corrosive agents within each strand. Provision may thus be made to cover each internal and intermediate layer of each strand with rubber during the method for manufacturing the cord. During this method, the deposited rubber penetrates the capillaries that are present between each layer of each strand and thus prevents the corrosive agents from spreading. Such cords, generally referred to as cords rubberized in situ, are well known from the prior art. However, the method for manufacturing these cords rubberized in situ requires mastery of numerous industrial constraints in order to avoid in particular the overspill of the rubber at the periphery of each strand.

Another solution for increasing the life of the tyre is to increase the force at break of the cords of the prior art. In general, the force at break is increased by increasing the diameter of the threads that make up the cord and/or by increasing the number of threads and/or the individual strength of each thread. However, increasing the diameter of the threads still further, for example beyond 0.50 mm, of necessity leads to a lowering of the flexibility of the cord, and this is not desirable for a cord used in the carcass reinforcement. Increasing the number of threads usually leads to a lowering of the ability of the elastomer compound to penetrate the strands. Increasing the individual strength of each thread entails significant investment in the installations used to manufacture the threads.

SUMMARY

The object of the invention is a cord that has improved bending endurance compared with cords of the prior art while at the same time avoiding the aforementioned disadvantages.

To this end, one subject of the invention is a two-layer multi-strand cord, comprising:
- an internal layer of the cord made up of K=1 three-layer internal strand comprising:
  - an internal layer made up of Q=1, 2, 3 or 4 internal metallic threads of diameter d1,
  - an intermediate layer made up of M intermediate metallic threads of diameter d2 wound around the internal layer, and
  - an external layer made up of N external metallic threads of diameter d3 wound around the intermediate layer,
- an external layer of the cord made up of L>1 three-layer external strands wound around the internal layer of the cord, comprising:
  - an internal layer made up of Q'=1, 2, 3 or 4 internal metallic threads of diameter d1',
  - an intermediate layer made up of M' intermediate metallic threads of diameter d2' wound around the internal layer, and
  - an external layer made up of N' external metallic threads of diameter d3' wound around the intermediate layer,
wherein the cord has:
a bending endurance criterion SL≤40 000 MPa·mm with $$SL = \max\left(\frac{\Delta\sigma_{bending\_CI}}{Cp}; \frac{\Delta\sigma_{bending\_CE}}{C_r \times Cp}\right);$$

and
a size criterion Ec≥0.46 with Ec=Sc/Se
where:
$\Delta\sigma_{bending\_CI}$=Msteel×Max(d1; d1'; d2; d2')/2 in MPa·mm is the maximum bending stress per unit curvature seen by the internal threads of the internal and external strands or intermediate threads of the internal and external strands;
$\Delta\sigma_{bending\_CE}$=Msteel×Max(d3; d3')/2 in MPa·mm is the maximum bending stress per unit curvature seen by the external metallic threads of the internal and external strands;
$M_{steel}$=210 000 MPa is the modulus of the steel;
d1, d1', d2, d2', d3 and d3' are expressed in mm, $$Cp = \frac{CpIT + CpTE}{2}$$

Cp is the penetration coefficient for the cord with $Cp_{IT}$ the inter-strand penetration coefficient and Cp TE the penetration coefficient for the external strands with:
$Cp_{IT}$=0.4 when the inter-strand distance E of the external strands (TE) of the external layer (CE) E<30 μm; or
$Cp_{IT}$=1.0 when E>70 μm; or
$Cp_{IT}$=0.015×E−0.05 when 30 μm≤E≤70 μm; and $$CpTE = \frac{CpC3' + \min(CpC2'; CpC3')}{2}$$

where CpC2' is the penetration coefficient for the intermediate layer of the external strand and CpC3' is the penetration coefficient for the external layer of the external strand such that:
Cp C2'=0.4 when the inter-thread distance I2' of the intermediate metallic threads of the intermediate layer I2'<10 μm; or
Cp C2'=1.0 when I2'>40 μm; or
Cp C2'=0.02×I2'+0.2 when 10 μm 40 μm and
Cp C3'=0.4 when the inter-thread distance I3' of the external metallic threads of the external layer I3'<10 μm; or
Cp C3'=1.0 when 13'>40 μm; or
Cp C3'=0.02×I3'+0.2 when 10 μm 40 μm
Cr is the dimensionless performance coefficient of the cord with $$C_r = 1 - \left( \frac{\sin(\alpha_f)}{d3 \times d3'} \times \frac{\left(\sum_{i=1}^{Q'+M'+N'} F_{mi}\right) \times \sin(\alpha t)}{N \times Cste} \right)$$

where:
d3 and d3' are expressed in mm,
αf is the angle of contact between the external metallic threads of the internal strand and the external metallic threads of the external strands expressed in radians,
αt is the helix angle of each external strand expressed in radians;

$$\sum_{i=1}^{Q'+M'+N'} F_{mi}$$

is the sum of the forces at break for the Q'+M'+N' threads of an external strand in Newtons;
Cste=1500 N·mm$^{-2}$;
D is the diameter of the cord in mm;
Sc is the compacted surface area in mm$^2$ with Sc=[Q×(d1/2)$^2$+M×(d2/2)$^2$+N×(d3/2)$^2$+L×(Q'×(d1'/2)$^2$+M×(d2'/2)$^2$+N'×(d3'/2)$^2$)]×π and Se is the surface area of the cord in mm$^2$ Se=π×(D/2)$^2$.

On the one hand, by virtue of its relatively low bending endurance criterion, the cord according to the invention makes it possible to reduce the levels of stresses in the cord subjected to bending stress loading and therefore to extend the life of the tyre. Specifically, the inventors behind the invention have discovered that the first determining criterion for improving the endurance performance of a cord in a corrosive environment was not only the force at break, as is widely taught in the prior art, but the bending endurance criterion, which is represented in the present application by an indicator equal to the maximum value out of:
the bending stress per unit curvature seen by the internal threads of the internal and external strands and seen by the intermediate threads of the internal and external strands divided by the penetration coefficient for the cord; or
the bending stress per unit curvature seen by the external threads of the internal and external strands divided by the penetration coefficient for the cord and by the performance coefficient of the cord.

On the one hand, the inventors behind the invention postulate the theory that the greater the surface area of the inter-thread contacts, more particularly in the inter-strand regions which are the most stressing, namely the more contact surface area there is between the external metallic threads of the internal strand and the external metallic threads of the external strands, the more the weakening load is diluted across the number of contacts. In order to optimize these contacts, the inventors behind the invention are postulating the theory that it is necessary to have lower stresses due to the tension in the cord for the same load or to have good geometric properties in the contact and more specifically in the angle of contact between the external metallic threads of the internal strand and the external metallic threads of the external strands in order to increase the contact surface area. At a given tension, the performance coefficient makes it possible to take account of the loss of tensile performance of the cord caused by transverse weakening in inter-thread contacts at the level of the external metallic threads of the internal layer and of the external layer. This performance coefficient is dependent on the number of external metallic threads of the internal layer, on the angle of contact between the external metallic threads of the internal strand and the external metallic threads of the external strands, on the diameters d3 and d3' of the external metallic threads of the internal layer and of the external metallic threads of the external layer, respectively, on the helix angle of an external strand and on the force at break of an external strand. Thus, a robust cord will have a performance coefficient close to 1 and a weakened cord will have a suboptimal performance coefficient rather closer to 0.5.

And, on the other hand, by virtue of its sufficiently high size criterion, the cord according to the invention makes it possible to have a maximum of metal mass on the smallest possible surface area making it possible to contribute to improving the bending endurance. Specifically, the inventors behind the invention have discovered that the second determining criterion for improving the endurance performance of a cord in a corrosive environment was not only the force at break, as is widely taught in the prior art, but the size criterion, which is represented in the present application by an indicator equal to the compacted surface area of the cord divided by the surface area of the cord.

Specifically, the cords of the prior art have either a relatively low bending endurance criterion but a non-optimal size criterion, or an optimal size criterion, i.e. beyond 0.46, but a relatively high bending endurance criterion. The cord according to the invention, because of its relatively high performance coefficient and relatively high penetration coefficient, has a relatively low endurance criterion and a relatively high size criterion, thus allowing improved bending endurance.

Any range of values denoted by the expression "between a and b" represents the range of values extending from more than a to less than b (namely excluding the end-points a and b), whereas any range of values denoted by the expression "from a to b" means the range of values extending from the end-point "a" as far as the end-point "b", namely including the strict end-points "a" and "b".

By definition, the diameter of a strand is the diameter of the smallest circle inside which the strand is circumscribed.

Advantageously, the diameter of the cord is the diameter of the smallest circle inside which the cord without the wrapper is circumscribed. For preference, the cord has a diameter D such that D≤6.0 mm, preferably such that 2.0 mm≤D≤5.5 mm. The diameter D is measured on the cord in accordance with standard ASTM D2969-04.

In the invention, the cord has two layers of strands, which means to say that it comprises an assembly made up of two layers of strands, neither more nor less, which means to say that the assembly has two layers of strands, not one, not three, but only two.

In one embodiment, the internal strand of the cord is surrounded by a polymer composition followed by the external layer.

Advantageously, the internal strand has cylindrical layers.

Advantageously, each external strand has cylindrical layers.

Highly advantageously, the internal strand and each external strand have cylindrical layers. It will be recalled that such cylindrical layers are obtained when the various layers of a strand are wound at different pitches and/or when the directions of winding of these layers differ from one layer to the other. A strand with cylindrical layers is very highly penetrable, unlike a strand with compact layers in which the pitches of all the layers are the same and the directions of winding of all the layers are the same, and which exhibits far lower penetrability.

The internal strand is a three-layer strand. The internal strand comprises an assembly of threads which is made up of three layers of threads, neither more nor less, which means to say that the assembly of threads has three layers of threads, not two, not four, but only three.

The external strand is a three-layer strand. The external strand comprises an assembly of threads which is made up of three layers of threads, neither more nor less, which means to say that the assembly of threads has three layers of threads, not two, not four, but only three.

It will be recalled that, as is known, the pitch of a strand represents the length of this strand, measured parallel to the axis of the cord, after which the strand that has this pitch has made a complete turn around said axis of the cord. Similarly, the pitch of a thread represents the length of this thread, measured parallel to the axis of the strand in which it is located, after which the thread that has this pitch has made a complete turn around said axis of the strand.

What is meant by the direction of winding of a layer of strands or of threads is the direction that the strands or the threads form with respect to the axis of the cord or of the strand. The direction of winding is commonly designated by either the letter Z or the letter S.

The pitches, directions of winding, and diameters of the threads and of the strands are determined in accordance with standard ASTM D2969-04 of 2014.

The angle of contact between the external metallic threads of the internal strand and the external metallic threads of the external strands is the angle $\alpha f$ indicated in FIG. 6. In this schematic depiction of the cord according to the invention, the axis A-A' of the cord, around which the internal layer of the cord and the external layer of the cord are wound, has been indicated. In this depiction, only one metallic thread of the external layer of the internal strand and one metallic thread of the external layer of the external strand have been retained, in order better to see the angle $\alpha f$ which is the angle of contact between the external metallic thread of the internal strand and the external metallic thread of the external strand. This is one of the relevant parameters in determining the coefficient of weakening of the cord because the smaller the angle of contact the less the weakening of the cord.

The helix angle of each external strand $\alpha t$ is a parameter well known to those skilled in the art and can be determined using the following calculation: $\tan \alpha t = 2 \times \pi \times Re_{TE}/pe$, in which formula pe is the pitch expressed in millimetres at which each external strand is wound, $Re_{TE}$ is the helix radius of each external strand, expressed in millimetres, and tan refers to the tangent function. $\alpha t$ is expressed in degrees.

By definition, the helix radius Re of the external layer of the cord is the radius of the theoretical circle passing through the centres of the external strands of the external layer in a plane perpendicular to the axis of the cord.

By definition, the inter-strand distance E of the external layer of external strands is defined, on a section of the cord perpendicular to the main axis of the cord, as being the shortest distance separating, on average, the circular envelopes in which two adjacent external strands are inscribed.

The inter-strand distance E is the distance between the 2 centres of 2 adjacent external strands, points A and B as shown in FIG. 8, minus the diameter of the external strand.

For preference, the threads of the one same layer of a predetermined (internal or external) strand all have substantially the same diameter. Advantageously, the external strands all have substantially the same diameter. What is meant by "substantially the same diameter" is that the threads or the strands have the same diameter to within the industrial tolerances.

For this, in an orthonormal 2D frame of reference, i.e. following the transverse cross section of the cord, taking OA for the direction of the x-axis with O the centre of the cord and in the case in which the external strands all have substantially the same diameter, the coordinates of the centres of 2 strands A and B are calculated: $A=[Re_{TE}, 0]$, $B=[Re_{TE} \times \cos(2\pi/L); Re_{TE} \times \sin(2\pi/L)]$ with L the number of external strands, $Re_{TE}$ the helix radius of each external strand expressed in millimetres.

The helix radius of each external strand is calculated according to the following formula: $Re_{TE}=\max(Re\_minTE; ReTEunsaturated)$ with
Re minTE the winding radius obtained in the event of oversaturation of the layer. This is the minimum radius for all the strands to be in contact.

$$Re\_\min TE=1/[(\sin^2(\pi/L)/D_{TE}/2)^2-\cos^2(\pi/L)\times(2\pi/pe)^2]$$

with L the number of external strands, pe the pitch expressed in millimetres at which each external strand is wound and $D_{TE}$ the diameter of the external strand in mm, and $Re_{TE\ unsaturated}$ corresponds to an unsaturated or strictly saturated architecture, $Re_{TE\ unsaturated}=D_{TI}/2+D_{TE}/2$ with DTI the diameter of the internal strand in mm and $D_{TE}$ the diameter of the external strand in mm.

The diameter of the external strand is calculated as follows:
$D_{TE}=2\times Re1'+d1'+2\times d2'+2\times d3'$ with Re1' the winding radius of the internal layer of the external strand, with
   if the internal layer of the external strand contains only 1 internal metallic thread: Re1'=0;
   Otherwise, $Re1'=1/[(\sin^2(\pi/Q')/d1'/2)^2-\cos^2(\pi/Q')\times(2\pi/p1')^2]$ with Q' the number of metallic threads of the internal layer of the external strand, d1' the diameter of the metallic threads of the internal layer of the external strand in mm and the pitch p1' the pitch of the internal layer of the external strand in mm.

Next the distance AB is calculated in a frame of reference according to the following formula: $AB=[(xb-xa)^2+(yb-ya)^2]^{1/2}$ and then the inter-strand distance in μm is found: $E=AB-D_{TE}/\cos(\alpha t) \times 1000$ with $D_{TE}$ the diameter of the external strand and $\alpha t=\text{atan}(2\pi Re_{TE}/pe)$ the helix angle of the external strand, with pe the pitch expressed in millimetres at which each external strand is wound.

By definition, the inter-thread distance of a layer is defined, in a section of the cord perpendicular to the main axis of the cord, as being the shortest distance separating, on average, two adjacent threads of the layer.

The inter-thread distance of the layer is calculated as follows:
The winding radius of the external layers of the external strands is calculated:

$$Re3'=Re1'+d1/2+d2+d3/2$$

with Re1' the winding radius of the internal layer of the external strand as defined previously.

The inter-thread distance I3' is the distance between 2 centres of metallic threads minus the thread diameter as presented in FIG. 8; the calculation method is the same as that for the external strands:

$$A'=[Re_{3'},0]$$

$$B'=[Re_3 \times \cos(2\pi/N'); Re3' \times \sin(2\pi/N')]$$

$$A'B'=[(xb'-xa')^2+(yb'-ya')^2]^{1/2}$$

$I3'=A'B'-d3'/\cos(\alpha C3') \times 1000$ is thus found, with $\alpha C3'=\text{atan}(2\pi R3'/p3')$ the helix angle of the external layer of the external strand.

The sum SI3' is the sum of the inter-thread distances separating each pair of adjacent external threads of the external layer.

The inter-thread distance I2' is the distance between 2 centres of intermediate metallic threads minus the thread diameter. The calculation is the same as that described above.

The sum SI2' is the sum of the inter-thread distances separating each pair of adjacent intermediate threads of the external layer.

For preference, the strands do not undergo pre-shaping.

According to the invention, the cord is made of metal. The term "metal cord" is understood by definition to mean a cord formed of threads made up predominantly (i.e. more than 50% of these threads) or entirely (100% of the threads) of a metallic material. Such a metallic material is preferably implemented using a material made of steel, more preferably of pearlitic (or ferritic-pearlitic) carbon steel referred to as "carbon steel" below, or else of stainless steel (by definition steel comprising at least 11% chromium and at least 50% iron). However, it is of course possible to use other steels or other alloys.

When a carbon steel is advantageously used, its carbon content (% by weight of steel) is preferably between 0.4% and 1.2%, in particular between 0.5% and 1.1%; these contents represent a good compromise between the mechanical properties required for the tyre and the feasibility of the threads.

The metal or the steel used, whether it is in particular a carbon steel or a stainless steel, may itself be coated with a metallic layer which improves for example the workability properties of the metal cord and/or of its constituent elements, or the use properties of the cord and/or of the tyre themselves, such as the properties of adhesion, corrosion resistance or else resistance to ageing. According to a preferred embodiment, the steel used is covered with a layer of brass (Zn—Cu alloy) or of zinc.

Advantageously, the external strands are wound in a helix around the internal strand with a pitch pe ranging from 30 mm to 100 mm and preferably ranging from 50 mm to 90 mm.

Another subject of the invention is a cord as described above extracted from a polymer matrix.

Preferably, the polymer matrix is an elastomer matrix.

The polymer matrix, preferably elastomer matrix, is based on a polymer, preferably elastomer, composition.

A polymer matrix is understood to be a matrix comprising at least one polymer. The polymer matrix is thus based on a polymer composition.

What is meant by an elastomer matrix is a matrix containing at least one elastomer.

The preferred elastomer matrix is thus based on an elastomer composition.

The expression "based on" should be understood as meaning that the composition comprises the mixture and/or the product of the in situ reaction of the various constituents used, some of these constituents being able to react and/or being intended to react with one another, at least partially, during the various phases of manufacture of the composition; it being possible therefore for the composition to be in the fully or partially crosslinked state or in the non-crosslinked state.

A polymer composition is understood as meaning that the composition comprises at least one polymer. Preferably, such a polymer may be a thermoplastic, for example a polyester or a polyamide, a thermosetting polymer, an elastomer, for example natural rubber, a thermoplastic elastomer or a combination of these polymers.

An elastomer composition is understood as meaning that the composition comprises at least one elastomer and at least one other component. Preferably, the composition comprising at least one elastomer and at least one other component comprises an elastomer, a crosslinking system and a filler.

As a reminder, a ply in a tyre is formed from the cord previously described embedded in the elastomer composition. The compositions that can be used for these plies are conventional compositions for the calendering of filamentary reinforcing elements and comprise a diene elastomer, for example natural rubber, a reinforcing filler, for example carbon black and/or silica, a crosslinking system, for example a vulcanizing system, preferably containing sulfur, stearic acid and zinc oxide, and possibly a vulcanization accelerant and/or retarder and/or various additives. The adhesion between the metalllic threads and the matrix in which they are embedded is afforded for example by a metal coating, for example a layer of brass.

The values of the features described in the present application for the extracted cord are measured on or determined from cords extracted from a polymer matrix, notably an elastomer matrix, for example of a tyre. Thus, for example on a tyre, the strip of material radially on the outside of the cord that is to be extracted is removed in order to be able to see the cord that is to be extracted radially flush with the polymer matrix. This removal can be done by stripping using cutters and grippers, or by planing. Next, the end of the cord that is to be extracted is uncovered using a knife. The cord is then pulled so as to extract it from the matrix, applying a relatively shallow angle in order not to plasticize the cord that is to be extracted. The extracted cords are then carefully cleaned, for example using a knife, so as to detach any remains of polymer matrix locally adhering to the cord, while taking care not to damage the surface of the metallic threads.

The advantageous features described hereinbelow apply equally to the cord as defined above and to the extracted cord.

Advantageously, SL≤37 500 MPa·mm and preferably SL≤35 000 MPa·mm.

The lower this SL criterion, the better the bending endurance of the cord.

Advantageously, SL≥25 000 MPa·mm and preferably SL≥27 500 MPa·mm.

Preferably SL is greater than 25 000 MPa·mm because a rather large size is sought by maximizing the metal mass.

Advantageously, Ec≥0.47 and preferably Ec≥0.48.

Advantageously, Ec≤0.65 and preferably Ec≤0.55.

Specifically, in these ranges of size criterion Ec, it is possible to obtain the maximum metal mass in the least possible surface area while at the same maintaining good penetration for the endurance criterion SL. Specifically, the greater the metal mass, the lower the tensile stresses in the cord for the same load and conversely, if the size is too large to have the same metal mass, the cord is larger and the elastomer composites comprising the cord are thicker leading to greater risks of heating and problems with the dimensioning of the final object.

For preference, αf is greater than or equal to 0° and preferably greater than or equal to 3°

For preference, αf is less than or equal to 25° and preferably less than or equal to 20°.

Over this range of angle of contact ranging from 0° to 25°, the region of contact is maximized and the cord is relatively well penetrated by the polymer composition.

For preference, αt is greater than or equal to 0° and preferably greater than or equal to 3°

For preference, αt is less than or equal to 20°, preferably less than or equal to 15° and more preferably less than or equal to 10°.

Over this range of helix angles, the loads of contact between external strands and the internal strand when tension is applied to the cord are minimized.

For calculating the bending endurance criterion, the angles of and at are expressed in radians, i.e. the value in degrees multiplied by π and divided by 180°.

In one embodiment, at least 50% of the metallic threads, preferably at least 60%, more preferably at least 70% of the metallic threads, and highly preferably each metallic thread of the cord comprises a steel core having a composition in accordance with standard NF EN 10020 from September 2000, and a carbon content C≤0.80%.

In another embodiment, at least 50% of the metallic threads, preferably at least 60%, more preferably at least 70% of the metallic threads, and highly preferably each metallic thread of the cord comprises a steel core having a composition in accordance with standard NF EN 10020 from September 2000, and a carbon content C>0.80%, preferably C≥0.82%. Such steel compositions combine non-alloyed steels (points 3.2.1 and 4.1 of standard NF EN 10020 from September 2000), stainless steels (points 3.2.2 and 4.2 of standard NF EN 10020 from September 2000) and other alloyed steels (points 3.2.3 and 4.3 of standard NF EN 10020 from September 2000). A relatively high carbon content makes it possible to achieve the mechanical strength of the metallic threads of the cords according to the invention. Advantageously, at least 50% of the metallic threads, preferably at least 60%, more preferably at least 70% of the metallic threads, and highly preferably each metallic thread of the cord comprises a steel core having a composition in accordance with standard NF EN 10020 from September 2000, and a carbon content C≤1.20%, preferably C≤1.10%. The use of an excessively high carbon content is, on the one hand, relatively expensive and, on the other hand, leads to a drop in the fatigue-corrosion endurance of the metallic threads.

For preference, d1, d1', d2, d2', d3, d3' range, independently of one another, from 0.12 mm to 0.38 mm and preferably from 0.15 mm to 0.35 mm.

In one embodiment, the cord is such that each external layer of the external strand is wound in a direction of winding that is the opposite to the direction of winding of the cord and the external layer of the internal strand is wound in the same direction of winding as the direction of winding of the cord. In this embodiment, the direction of winding of each external thread of the external strand in a direction of winding that is the opposite to the direction of winding of each external thread of the internal strand makes it possible to form contact regions that are less point-like and relatively more extensive, favouring the performance coefficient.

In another embodiment, the cord is such that each external layer of each external strand and the external layer of the internal strand are wound in the same direction of winding as the direction of winding of the cord. In this other embodiment, a more point-like and less linear contact region is formed, favouring the performance coefficient less but allowing easier industrial implementation because all the layers are wound in the same direction and the cord is assembled. in the same direction.

In an alternative, when Q>1, each internal and intermediate layer of each external strand is wound in the direction of winding that is the opposite to the direction of winding of the cord, and the internal and intermediate layers of the internal strand are wound in the direction of winding of the cord.

In another alternative, when Q>1, each internal and intermediate layer of each external strand and the internal and intermediate layers of the internal strand are wound in the direction of winding of the cord.

Advantageously, it is possible to envisage, when Q>1 in particular, the various combinations of directions of winding that are collated in Table 1 below.

TABLE 1

| | | Cord | | | | | | | | | | | |
|---|---|---|---|---|---|---|---|---|---|---|---|---|---|
| Internal strand | Direction for C1 | S | Z | S | Z | Z | S | Z | S | S | Z | S | S |
| | Direction for C2 | S | Z | S | Z | Z | Z | Z | Z | Z | Z | Z | S |
| | Direction for C3 | S | Z | S | Z | S | Z | S | Z | S | Z | Z | Z |
| External strand | Direction for C1' | S | Z | Z | S | Z | S | S | Z | Z | S | Z | Z |
| | Direction for C2' | S | Z | Z | S | Z | Z | S | Z | Z | S | S | Z |
| | Direction for C3' | S | Z | Z | S | S | Z | S | Z | S | Z | S | S |
| Direction of winding of the cord | | S | Z | S | Z | S | Z | S | Z | Z | Z | Z | Z |

Advantageously, the penetration coefficient for the cord Cp is greater than or equal to 0.60 and preferably greater than or equal to 0.70. Specifically, there is enough space left between the threads or the strands to allow a polymer composition, preferably an elastomer composition, to pass.

Advantageously, the external layer of the cord is desaturated.

By definition, a desaturated layer is such that there is enough space left between the threads to allow a polymer composition, preferably an elastomer composition, to pass. A desaturated layer means that the threads do not touch and that there is enough space between two adjacent threads to allow a polymer composition, preferably an elastomer composition, to pass. By contrast, a saturated layer is such that there is not enough space between the threads of the layer to allow a polymer composition, preferably an elastomer composition, to pass, for example because each pair of two threads of the layer touch one another.

By definition, a desaturated layer of cord is such that the inter-strand distance for the external strands is greater than or equal to 30 μm. The inter-strand distance of the external layer of external strands is defined, on a section of the cord perpendicular to the main axis of the cord, as being the shortest distance separating, on average, the circular envelopes in which two adjacent external strands are inscribed. Thus, this construction of the cord makes it possible to ensure good penetrability by the elastomer composition of the external layer.

Advantageously, the external layer of the internal strand is desaturated.

Advantageously, the inter-thread distance of the external layer of the internal strand is greater than or equal to 10 μm. For preference, the inter-thread distance of the external layer of the internal strand is greater than or equal to 15 μm.

For preference, the inter-thread distance of the external layer of the internal strand is less than or equal to 100 μm.

Advantageously, the sum SI2 of the inter-thread distances I2 of the intermediate layer of the internal strand is greater than the diameter d2 of the intermediate threads of the intermediate layer.

Advantageously, the sum SI3 of the inter-thread distances I3 of the external layer of the internal strand is greater than the diameter d3 of the external threads of the external layer.

Advantageously, each strand is of the type not rubberized in situ. What is meant by not rubberized in situ is that, prior to the strands being assembled with one another, each strand is made up of the threads of the various layers and does not have any polymer composition, notably any elastomer composition.

Advantageously, the external layer of each external strand is desaturated.

Advantageously, the inter-thread distance of the external layer of each external strand is greater than or equal to 10 μm. For preference, the inter-thread distance of the external layer of each external strand is greater than or equal to 15 μm.

For preference, the inter-thread distance of the external layer of each external strand is less than or equal to 100 μm.

Advantageously, the sum SI2' of the inter-thread distances I2' of the intermediate layer of each external strand is greater than the diameter d2' of the intermediate threads of the intermediate layer.

Advantageously, the sum SI3' of the inter-thread distances I3' of the external layer of each external strand is greater than or equal to the diameter d3' of the external threads of the external layer.

For preference, the external layer of the internal strand is wound around the intermediate layer of the internal strand in contact with the intermediate layer of the internal strand and the intermediate layer of the internal strand is wound around the internal layer of the internal strand in contact with the internal layer of the internal strand.

For preference, the external layer of the external strand is wound around the intermediate layer of the external strand in contact with the intermediate layer of the external strand and the intermediate layer of the external strand is wound around the internal layer of the external strand in contact with the internal layer of the external strand.

Advantageously, L=6, 7 or 8; for preference L=6 or 7 and more preferably L=6.

For preference, K=1 and L=6. In the cord in which K=1, the most severe transverse loads are the transverse loads exerted by the external strands on the internal strand.

Internal Strand of the Cord According to the Invention

In one embodiment, Q=1.

Advantageously, M=3, 4, 5 or 6 and for preference M=3 or 4.

Advantageously, N=9, 10 or 11 and for preference N=9.

In another preferred embodiment, Q>1, for preference Q=2, 3 or 4.

Advantageously, M=7, 8, 9 or 10 and for preference M=7, 8 or 9.

Advantageously, N=12, 13, 14 or 15 and for preference N=12, 13 or 14.

In a first alternative form, Q=2, M=7 or 8 and N=12 or 13.

In a second alternative form, Q=3, M=8 or 9 and N=13 or 14.

In a third alternative form, Q=4, M=9 or 10 and N=12, 13 or 14, for preference Q=4, M=9 and N=14.

Highly advantageously, each internal thread of the internal strand has a diameter d1 equal to the diameter d2 of each intermediate thread of the internal strand and equal to the diameter d3 of each external thread of the internal strand. Thus, the same diameter of thread is preferably used in the internal, intermediate and external layers of the internal strand, thereby limiting the number of different threads that need to be managed during the manufacture of the cord.

External Strands of the Cord According to the Invention

In one embodiment, Q'=1.

Advantageously, M'=3, 4, 5 or 6 and for preference M'=3 or 4.

Advantageously, N'=9, 10 or 11 and for preference N'=9.

In another preferred embodiment, Q'>1, for preference Q'=2, 3 or 4.

Advantageously, M'=7, 8, 9 or 10 and for preference M'=7, 8 or 9.

Advantageously, N'=12, 13, 14 or 15 and for preference N'=12, 13 or 14.

In a first alternative form, Q'=2, M'=7 or 8 and N'=12 or 13.

In a second alternative form, Q'=3, M'=8 or 9 and N'=13 or 14, for preference Q'=3, M'=9 and N'=14.

In a third alternative form, Q'=4, M'=9 or 10 and N'=12, 13 or 14.

Highly advantageously, each intermediate thread of the external strand has a diameter d2' equal to the diameter d3' of each external thread of the external strand. Thus, the same diameter of thread is preferably used in the intermediate and external layers of the external strand, thereby limiting the number of different threads that need to be managed during the manufacture of the cord.

Advantageously, Q=4, M=9 and N=14, Q'=3, M'=9 and N'=14, and d1=d2=d3=d1', d2'=d3' and d3'≤d1'. Specifically, the capillary at the centre of each external strand is smaller than that at the centre of the internal strand and makes it possible in the event of perforation to reduce the spreading of the corrosion.

Reinforced Product According to the Invention

Another subject of the invention is a reinforced product comprising a polymer matrix and at least one cord as defined above.

Advantageously, the reinforced product comprises one or more cords according to the invention embedded in the polymer matrix and, in the case of a plurality of cords, the cords are arranged side-by-side in a main direction.

Tyre According to the Invention

Another subject of the invention is a tyre comprising at least one cord as defined above.

In one embodiment, the tyre has a carcass reinforcement anchored in two beads and surmounted radially by a crown reinforcement which is itself surmounted by a tread, the carcass reinforcement having at least one cord as defined above.

The cord is most particularly intended for industrial vehicles selected from heavy vehicles such as "heavy-duty vehicles"—i.e. underground trains, buses, road haulage vehicles (lorries, tractors, trailers), off-road vehicles—agricultural vehicles or construction plant vehicles, or other transport or handling vehicles.

As a preference, the tyre is for a vehicle of the construction plant type. Thus, the tyre has a dimension in which the diameter, in inches, of the seat of the rim on which the tyre is intended to be mounted is greater than or equal to 25 inches, preferably from 39 to 63 inches.

The invention also relates to a rubber item comprising an assembly according to the invention, or an impregnated assembly according to the invention. What is meant by a rubber item is any type of item made of rubber, such as a ball, a non-pneumatic object such as a non-pneumatic tyre, a conveyor belt or a caterpillar track.

BRIEF DESCRIPTION OF THE FIGURES

A better understanding of the invention will be obtained on reading the examples which will follow, given solely by way of non-limiting examples and with reference to the drawings, in which.

DETAILED DESCRIPTION

Example of a Tyre According to the Invention

Figure 1:
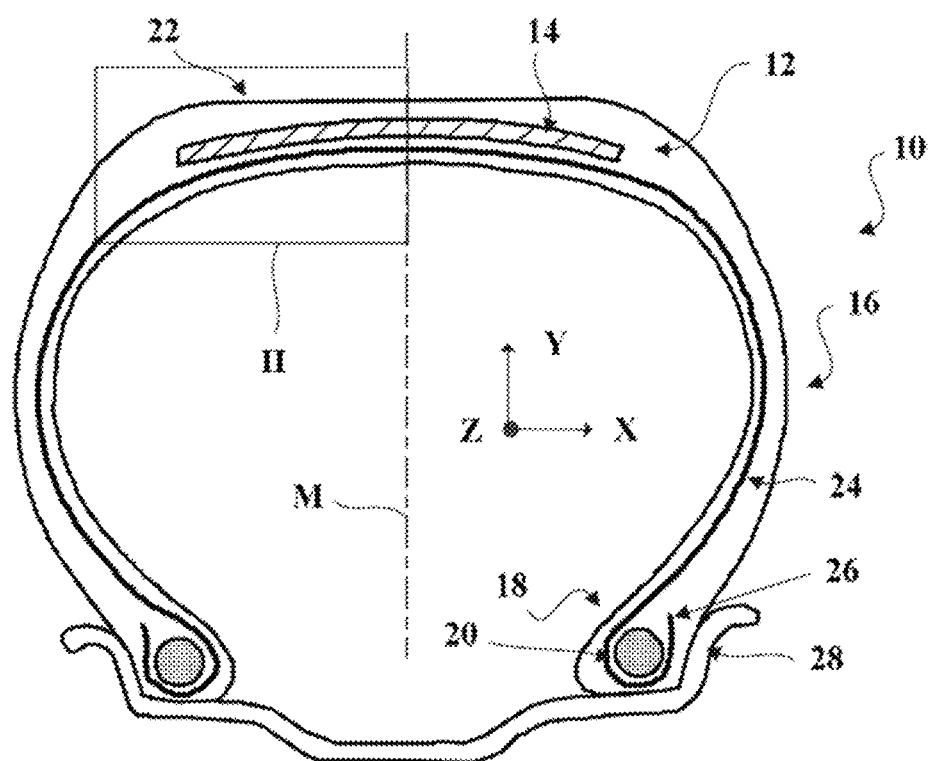
FIG. 1 is a view in cross section perpendicular to the circumferential direction of a tyre according to the invention.
Figure 2:
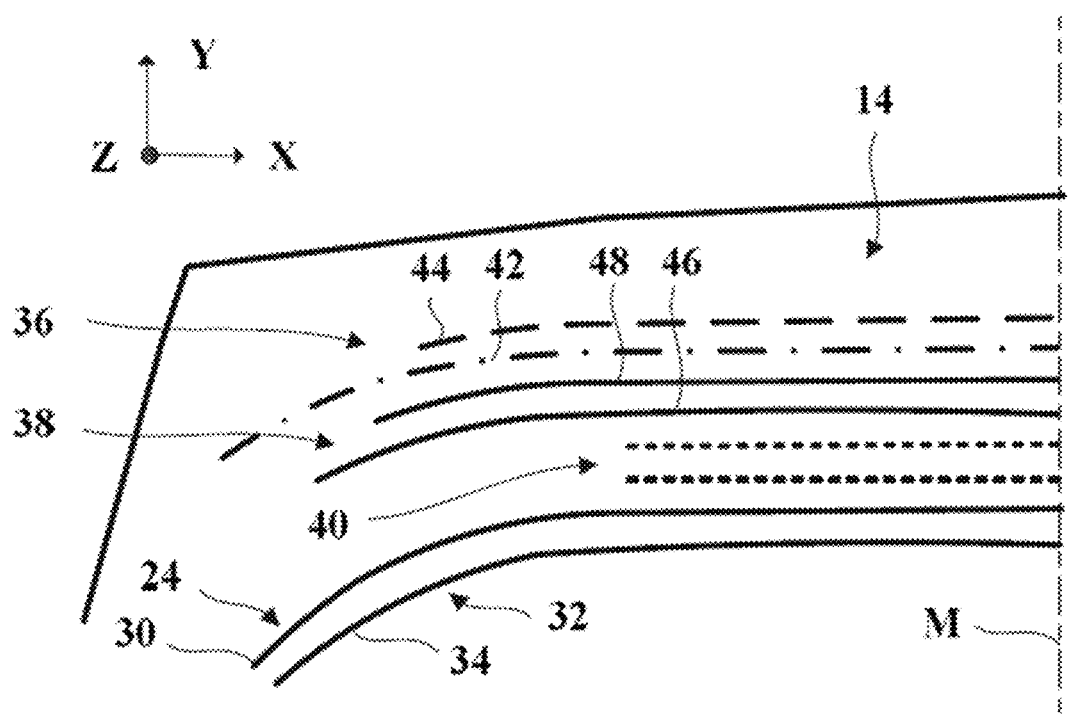
FIG. 2 is a detail view of the region II of FIG. 1.

A frame of reference X, Y, Z corresponding to the usual respectively axial (X), radial (Y) and circumferential (Z) orientations of a tyre has been depicted in FIGS. 1 and 2.

The "median circumferential plane" M of the tyre is the plane that is normal to the axis of rotation of the tyre and that is located equidistantly from the annular reinforcement structures of each bead.

FIGS. 1 and 2 depict a tyre according to the invention and denoted by the general reference 10.

The tyre 10 is for a heavy vehicle of construction plant type, for example of "dumper" type. Thus, the tyre 10 has a dimension of the type 53/80 R 63.

The tyre 10 has a crown 12 reinforced by a crown reinforcement 14, two sidewalls 16 and two beads 18, each of these beads 18 being reinforced with an annular structure, in this instance a bead wire 20. The crown reinforcement 14 is surmounted radially by a tread 22 and connected to the beads 18 by the sidewalls 16. A carcass reinforcement 24 is anchored in the two beads 18 and in this instance wound around the two bead wires 20 and comprises a turnup 26 positioned towards the outside of the tyre 20, which is shown here fitted onto a wheel rim 28. The carcass reinforcement 24 is surmounted radially by the crown reinforcement 14.

The carcass reinforcement 24 comprises at least one carcass ply 30 reinforced by radial carcass cords 50 according to the invention (not depicted). The carcass cords 50 are positioned substantially parallel to one another and extend from one bead 18 to the other so as to form an angle comprised between 80° and 90° with the median circumferential plane M (plane perpendicular to the axis of rotation of the tyre which is situated midway between the two beads 18 and passes through the middle of the crown reinforcement 14).

The tyre 10 also comprises a sealing ply 32 made up of an elastomer (commonly known as "internal liner") which defines the radially internal face 34 of the tyre 10 and which is intended to protect the carcass ply 30 from the diffusion of air coming from the space inside the tyre 10.

The crown reinforcement 14 comprises, radially from the outside towards the inside of the tyre 10, a protective reinforcement 36 arranged radially on the inside of the tread 22, a working reinforcement 38 arranged radially on the inside of the protective reinforcement 36 and an additional reinforcement 40 arranged radially on the inside of the working reinforcement 38. The protective reinforcement 36 is thus interposed radially between the tread 22 and the working reinforcement 38. The working reinforcement 38 is interposed radially between the protective reinforcement 36 and the additional reinforcement 40.

The protective reinforcement 36 comprises first and second protective plies 42, 44 comprising protective metal cords, the first ply 42 being arranged radially on the inside of the second ply 44. Optionally, the protective metal cords make an angle at least equal to 10°, preferably in the range from 10° to 35° and more preferably from 15° to 30°, with the circumferential direction Z of the tyre.

The working reinforcement 38 comprises first and second working plies 46, 48, the first ply 46 being arranged radially on the inside of the second ply 48.

The additional reinforcement 40, also referred to as a limiting block, the purpose of which is to absorb in part the mechanical stresses of inflation, comprises, for example and as known per se, additional metallic reinforcing elements, for example as described in FR 2 419 181 or FR 2 419 182, making an angle at most equal to 10°, preferably in the range from 5° to 10°, with the circumferential direction Z of the tyre 10.

Example of a Reinforced Product According to the Invention

Figure 3:
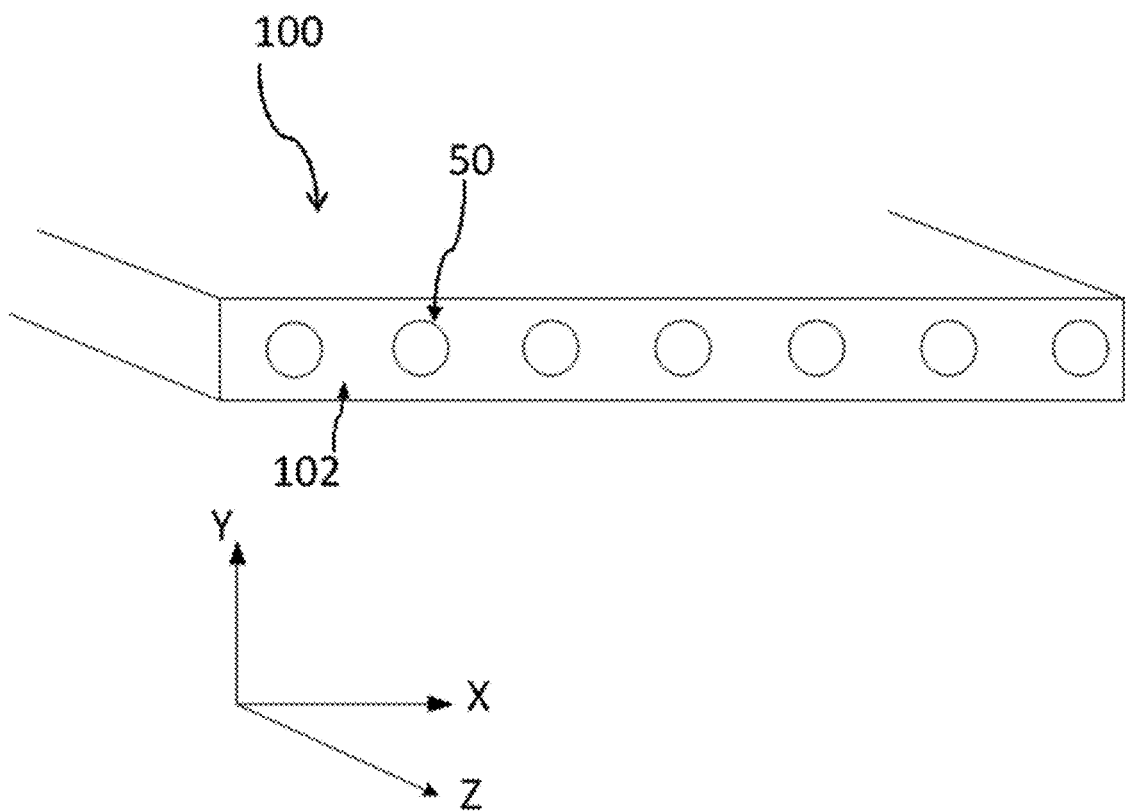
FIG. 3 is a view in cross section of a reinforced product according to the invention.

FIG. 3 depicts a reinforced product according to the invention and denoted by the general reference 100. The reinforced product 100 comprises at least one cord 50, in this instance a plurality of cords 50, embedded in the polymer matrix 102.

FIG. 3 depicts the polymer matrix 102, the cords 50 in a frame of reference X, Y, Z, in which the direction Y is the radial direction and the directions X and Z are the axial and circumferential directions. In FIG. 3, the reinforced product 100 comprises a plurality of cords 50 arranged side-by-side in the main direction X and extending parallel to one another within the reinforced product 100 and collectively embedded in the polymer matrix 102. In this instance, the polymer matrix 102 is an elastomer matrix based on an elastomer composition.

Cord According to a First Embodiment of the Invention

Figure 4:
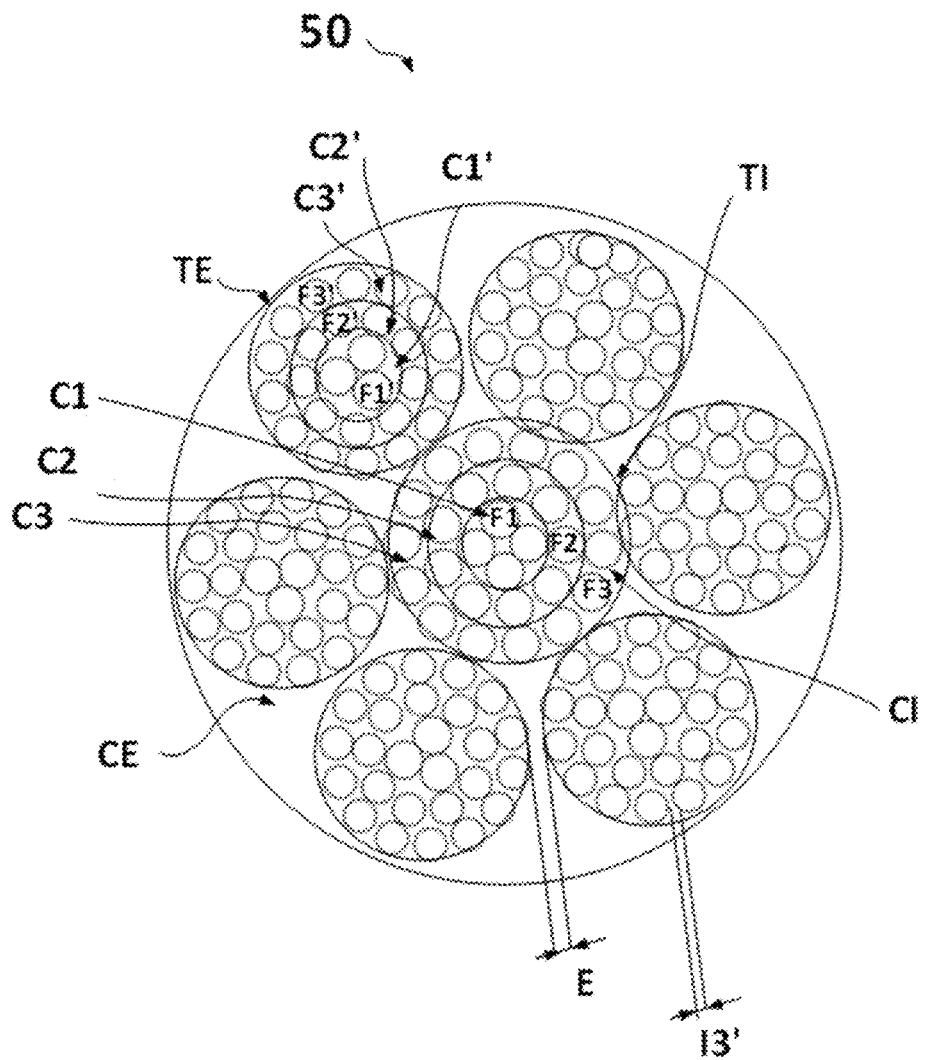
FIG. 4 is a schematic view in cross section perpendicular to the axis of the cord (which is assumed to be straight and at rest) of a cord (50) according to a first embodiment of the invention.
Figure 5:
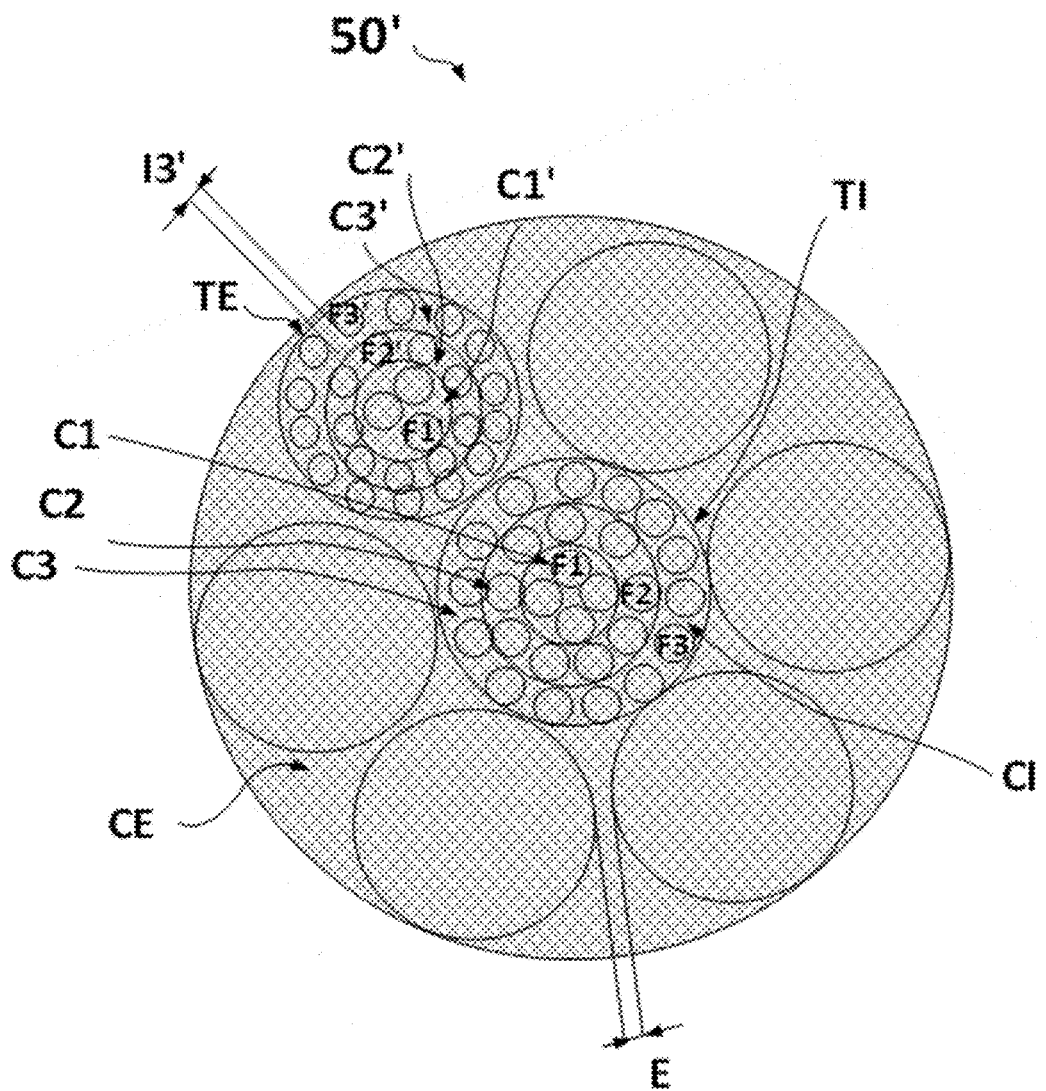
FIG. 5 is a schematic view in cross section perpendicular to the axis of the cord (which is assumed to be straight and at rest) of an extracted cord (50') according to a first embodiment of the invention.
Figure 6:
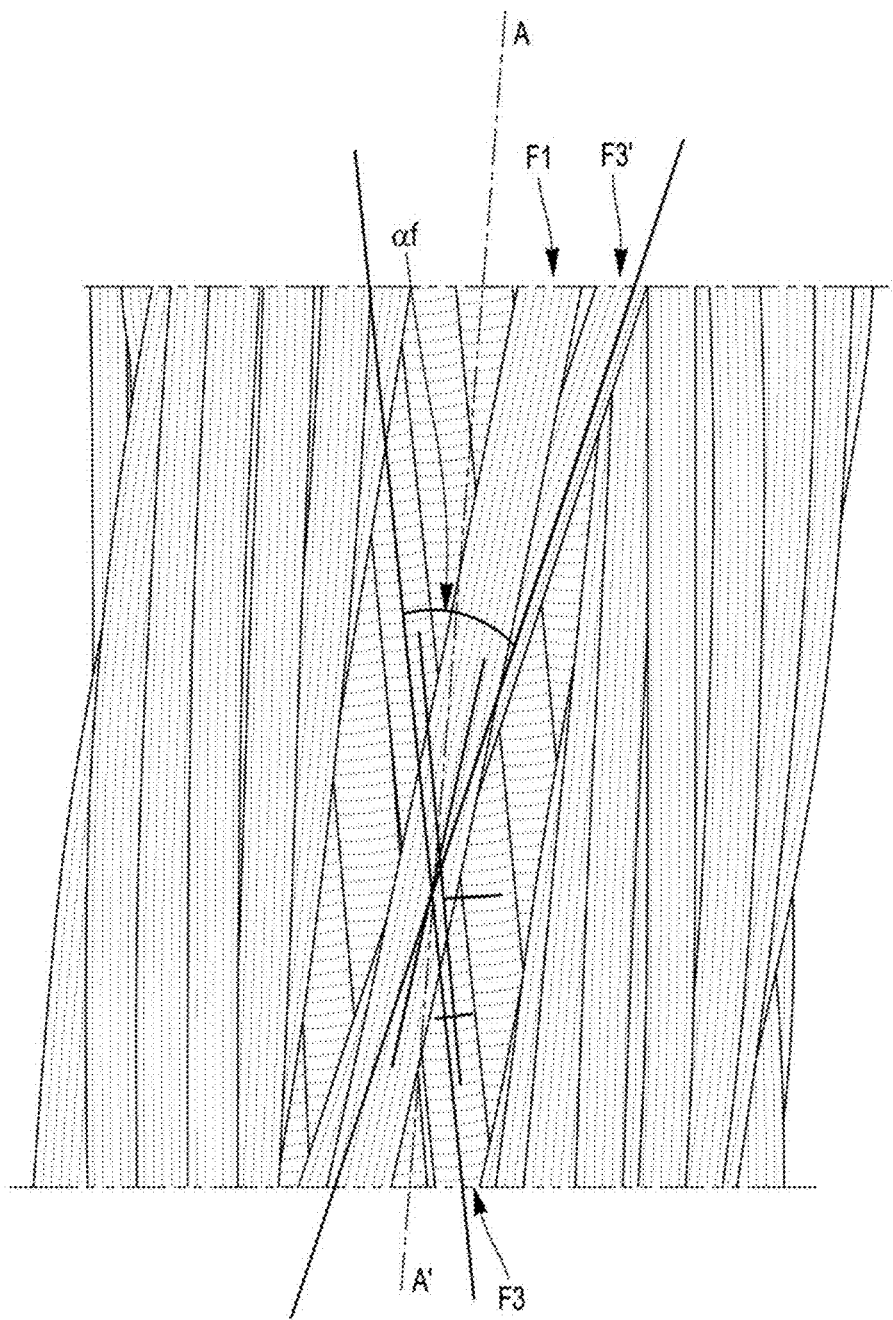
FIG. 6 is a schematic depiction of the angle αf of the cord (50) of FIG. 4.

FIGS. 4 and 5 respectively depict the cord 50 and the cord 50' according to a first embodiment of the invention.

The cords 50 and 50' have the same geometric structure. The cord 50' is obtained after extraction from the tyre 10.

Figure 7:
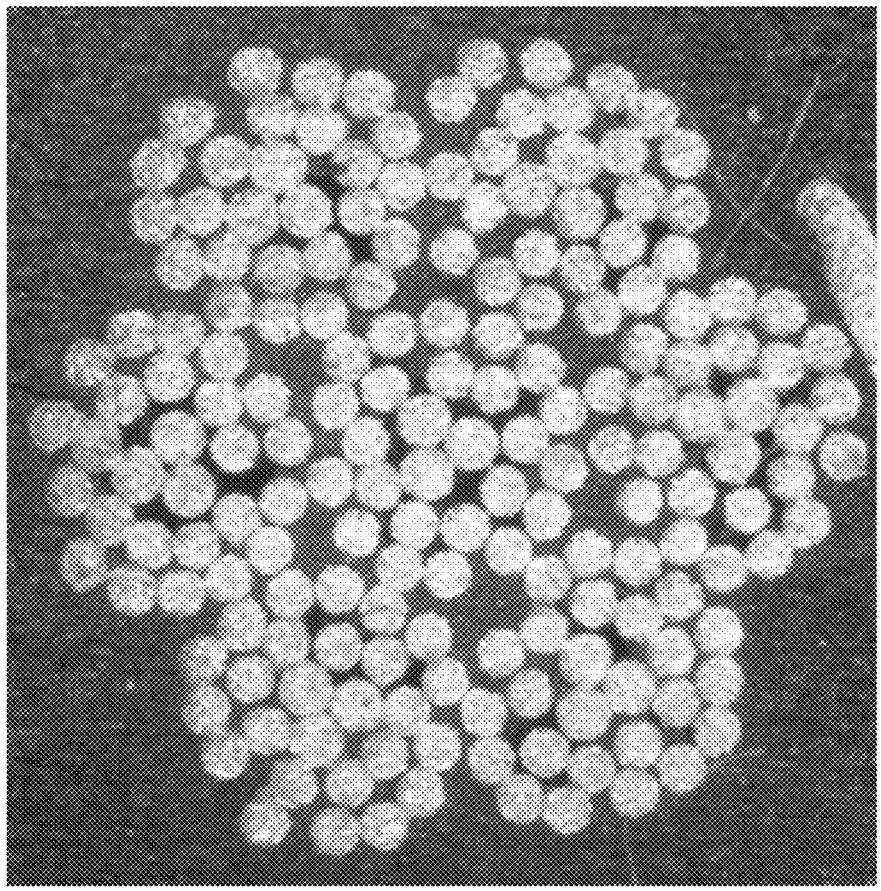
FIG. 7 is a photograph of a cord (50) according to a first embodiment of the invention.
Figure 8:
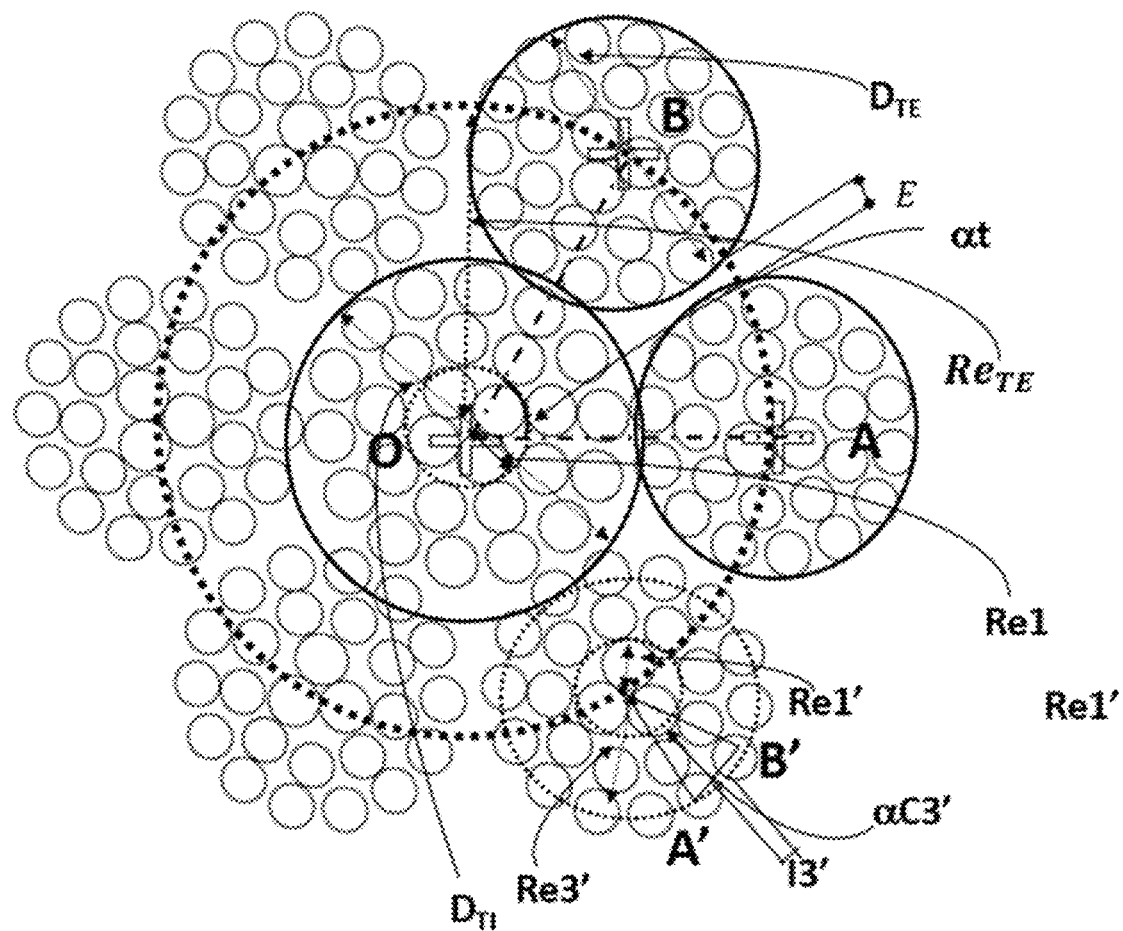
FIG. 8 is a schematic view of various geometric parameters of the cord.

FIG. 7 shows a photograph of the cord 50.

The cord 50 and the extracted cord 50' are made of metal and are of the multi-strand type with two cylindrical layers. Thus, it will be understood that there are two layers, not more, not less, of strands of which the cord 50 or 50' is made.

The cord 50 or the cord 50' comprises an internal layer CI of the cord which is made up of K=1 internal strand TI. The external layer CE is made up of L>1 external strands TE wound around the internal layer CI of the cord. In this particular instance, L=6, 7 or 8; for preference L=6 or 7 and more preferably, L=6 and here L=6.

The cord has a bending endurance criterion $$SL = \max\left(\frac{\Delta\sigma_{bending\_CI}}{Cp}; \frac{\Delta\sigma_{bending\_CE}}{C_r \times Cp}\right)$$

$\Delta\sigma_{bending\_CI} = M_{steel} \times \text{Max}(d1; d1'; d2; d2')/2 = 210\,000 \times 0.26/2 = 27\,300$ MPa·mm and $\Delta\sigma_{bending\_CE} = M_{steel} \times \text{Max}(d3; d3')/2 = 210\,000 \times 0.26/2 = 27\,300$ MPa·mm.

The inter-strand distance E=80 µm>70 µm, thus $Cp_{IT} = 1.00$

The inter-thread distance I3'=43 µm, thus Cp C3'=1.00 when 40 µm

The inter-thread distance I2'=36 µm, thus Cp C2'=0.02× 36+0.2=0.92

$CpTe = (1+0.92)/2 = 0.96$ $Cp = (0.96+1.00)/2 = 0.98$ $$C_r = 1 - \left(\frac{\sin(\alpha_f)}{d3 \times d3'} \times \frac{\left(\sum_{i=1}^{Q'+M'+N'} F_{mi}\right) \times \sin(\alpha t)}{N \times Cste}\right) =$$

$$1 - \left(\frac{\sin\left(6.6 \times \frac{\pi}{180}\right)}{0.26 \times 0.26} \times \frac{3387 \times \sin\left(8.1 \times \frac{\pi}{180}\right)}{14 \times 1500}\right) = 0.96.$$

$$SL = \max\left(\frac{27300}{0.98}; \frac{27300}{0.98 \times 0.96}\right) = \max(28857; 29017) = 29017 \text{ MPa·mm}$$

which is well below 40 000 MPa·mm. SL≤37 500 MPa·mm, preferably SL≤35 000 MPa·mm and SL≥25 000 MPa·mm and preferably SL≥27 500 MPa·mm.

The compacted surface area Sc=[4×(0.26/2)²+9× (0.26/2)²+14×(0.26/2)²+6×(3×(0.26/2)²+9×(0.2372)²+14× (0.23/2)²]×π=8.10

The surface area Se=π×(4.6/2)²=16.88.

Ec=Sc/Se=8.10/16.88=0.48   Ec≥0.47,   Ec≥0.48   and Ec≤0.65 and preferably Ec≤0.55.

The penetration coefficient for the cords 50 and 50' is equal to 0.98, which is greater than or equal to 0.60 and preferably greater than or equal to 0.70.

The external layer of the cords 50 and 50' is desaturated. Thus, the inter-strand distance E of the external strands is strictly greater than 20 µm. Here, E=80 µm.

αf is greater than or equal to 0° and preferably greater than or equal to 3° and less than or equal to 25° and preferably greater than or equal to 20°. Here αf=6.6°.

αt is greater than or equal to 0° and preferably greater than or equal to 3° and less than or equal to 20°, preferably less than or equal to 15° and more preferably less than or equal to 10°. Here αt=8.1°.

Internal Strands TI of the Cords 50 and 50'

Each internal strand TI is a three-layer strand and comprises an internal layer C1 made up of Q=2, 3 or 4 internal metallic threads F1, an intermediate layer C2 made up of M intermediate metallic threads F2 wound around the internal layer C1 and an external layer C3 made up of N external metallic threads F3 wound around the intermediate layer C2.

Here, Q=4.

M=7, 8, 9 or 10 and for preference M=7, 8 or 9. Here M=9.

N=12, 13, 14 or 15 and for preference N=12, 13 or 14. Here N=14.

The external layer C3 of each internal strand TI is desaturated. The inter-thread distance of the external layer of the internal strand is greater than or equal to 30 µm, and in this case equal to 46 µm. The sum SI3 of the inter-thread distances I3 of the external layer C3 is greater than the diameter d3 of the external threads F3 of the external layer C3. Here, the sum S13=0.046×14=0.64 mm, which is a value greater than d3=0.26 mm.

d1, d2 and d3 range, independently of one another, from 0.12 mm to 0.38 mm and preferably from 0.15 mm to 0.35 mm. Here d1=d2=d3=0.26 mm.

External Strands TE of the Cords 50 and 50'

Each external strand TE has three layers and comprises an internal layer C1' made up of Q'=2, 3 or 4 internal metallic threads F1', an intermediate layer C2' made up of M' intermediate metallic threads F2' wound around the internal layer C1' and an external layer C3' made up of N' external metallic threads F3' wound around the intermediate layer C2'.

Here, Q'=3.

M'=7, 8, 9 or 10 and for preference M'=7, 8 or 9. Here M'=9.

N'=12, 13, 14 or 15 and for preference N'=12, 13 or 14. Here N'=14.

The external layer C3' of each external strand TE is desaturated. Because it is desaturated, the inter-thread distance I3' of the external layer C3' which on average separates the N' external threads is greater than or equal to 10 μm. The inter-thread distance I3' of the external layer of each external strand is greater than or equal to 30 μm, and in this case equal to 43 μm. The sum SI3' of the inter-thread distances I3' of the external layer C3' is greater than the diameter d3' of the external threads F3' of the external layer C3'. Here, the sum SI3'=0.043×14=0.60 mm, which is a value greater than d3'=0.23 mm.

Each external layer C3' of the external strand TE is wound in a direction of winding that is the opposite to the direction of winding of the cord and the external layer C3 of the internal strand TI is wound in the same direction of winding as the direction of winding of the cord. And each internal C1' and intermediate C2' layer of each external strand TE is wound in the direction of winding that is the opposite to the direction of winding of the cord, and the internal C1 and intermediate C2 layers of the internal strand TI are wound in the direction of winding of the cord. In this case, the direction of winding of the layers C1, C2, C3 and of the cord is Z and that of the layers C1', C2' and C3' is S.

Method for Manufacturing the Cord According to the Invention

One example of a method for manufacturing the multi-strand cord 50 will now be described.

Each aforementioned internal strand is manufactured according to known methods involving the following steps, preferably performed in line and continuously:
- first of all, a first step of assembling, by cabling or by twisting, the Q=4 internal threads F1 of the internal layer C1 at the pitch p1 and in the Z-direction to form the internal layer C1 at a first assembling point;
- followed by a second step of assembling, by cabling or by twisting, the M=9 intermediate threads F2 around the Q internal threads F1 of the internal layer C1 at the pitch p2 and in the Z-direction to form the intermediate layer C2 at a second assembling point;
- followed by a third step of assembling, by cabling or by twisting, the N=14 external threads F3 around the M intermediate threads F2 of the intermediate layer C2 at the pitch p3 and in the Z-direction to form the external layer C3 at a third assembling point;
- preferably a final twist-balancing step.

Each aforementioned external strand is manufactured according to known methods involving the following steps, preferably performed in line and continuously:
- first of all, a first step of assembling, by cabling or by twisting, the Q'=3 internal threads F1' of the internal layer C1' at the pitch p1' and in the S-direction to form the internal layer C1' at a first assembling point;
- followed by a second step of assembling, by cabling or by twisting, the M'=9 intermediate threads F2' around the Q' internal threads F1' of the internal layer C1' at the pitch p2' and in the S-direction to form the intermediate layer C2' at a second assembling point;
- followed by a third step of assembling, by cabling or by twisting, the N'=14 external threads F3' around the M' intermediate threads F2' of the intermediate layer C2' at the pitch p3' and in the S-direction to form the external layer C3' at a third assembling point;
- preferably a final twist-balancing step.

What is meant here by "twist balancing" is, as is well known to those skilled in the art, the cancellation of the residual torque (or the elastic return of the twist) applied to each thread of the strand, in the intermediate layer as in the external layer.

After this final twist-balancing step, the manufacture of the strand is complete. Each strand is wound onto one or more receiving reels, for storage, prior to the later operation of assembling the elementary strands by cabling in order to obtain the multi-strand cord.

In order to manufacture the multi-strand cord of the invention, the method, as is well known to those skilled in the art, is to cable or twist together the strands previously obtained, using cabling or twisting machines rated for assembling strands.

Thus, the L=6 external strands TE are assembled around the internal strand TI at the pitch pe and in the Z-direction to form the cord 50. Possibly, in a last assembly step, the wrapper F is wound, at the pitch pf and in the S-direction, around the assembly previously obtained.

The cord 50 is then incorporated by calendering into composite fabrics formed from a known composition based on natural rubber and carbon black as reinforcing filler, conventionally used for manufacturing crown reinforcements of radial tyres. This composition essentially contains, in addition to the elastomer and the reinforcing filler (carbon black), an antioxidant, stearic acid, an extender oil, cobalt naphthenate as adhesion promoter, and finally a vulcanization system (sulfur, accelerator and ZnO).

The composite fabrics reinforced by these cords have an elastomer composition matrix formed from two thin layers of elastomer composition which are superposed on either side of the cords and which have a thickness ranging between 1 and 4 mm, respectively. The calendering pitch (spacing at which the cords are laid in the elastomer composition fabric) ranges from 4 mm to 8 mm.

These composite fabrics are then used as carcass ply in the carcass reinforcement during the method for manufacturing the tyre, the steps of which are otherwise known to a person skilled in the art.

Cord According to a Second Embodiment of the Invention

Unlike in the first embodiment described hereinabove, the cord 60 according to the second embodiment is such that Q'=1, M'=4 and N'=9 and Q'=1, M'=3 and N'=9.

Table 2 below summarizes the characteristics of the various cords 50, 50' and 60 according to the invention.

TABLE 2

| Cords | | 50 | 50' | 60 |
|---|---|---|---|---|
| TI | Q/M/N | 4/9/14 | 4/9/14 | 1/4/9 |
| | d1/d2/d3 (mm) | 0.26/0.26/0.26 | 0.26/0.26/0.26 | 0.12/0.26/0.26 |
| | direction for C1/ pitch p1 (mm) | Z/6 | Z/6 | Z/inf |
| | direction for C2/ pitch p2 (mm) | Z/12 | Z/12 | Z/6 |

TABLE 2-continued

| Cords | 50 | 50' | 60 |
|---|---|---|---|
| direction for C3/pitch p3 (mm) | Z/18 | Z/18 | Z/12 |
| I2(μm)/SI2(mm) | 38/0.34 | 38/0.34 | 6/0.02 |
| I3(μm)/SI3(mm) | 46/0.64 | 46/0.64 | 42/0.38 |
| TE  Q'/M'/N' | 3/9/14 | 3/9/14 | 1/3/9 |
| d1'/d2'/d3' (mm) | 0.26/0.23/0.23 | 0.26/0.23/0.23 | 0.10/0.23/0.23 |
| direction for C1'/pitch p1' (mm) | S/6 | S/6 | S/inf |
| direction for C2'/pitch p2' (mm) | S/12 | S/12 | S/6 |
| direction for C3'/pitch p3' (mm) | S/18 | S/18 | S/12 |
| I2'(μm)/SI2'(mm) | 36/0.32 | 36/0.32 | 53/0.15 |
| I3'(μm)/SI3'(mm) | 43/0.60 | 43/0.60 | 36/0.32 |
| Direction of cord/pi/pe | Z/inf/60 | Z/inf/60 | Z/inf/60 |
| K | 1 | 1 | 1 |
| L | 6 | 6 | 6 |
| E (μm) | 80 | 80 | 69 |
| D (mm) | 4.6 | 4.6 | 3.2 |
| $\Delta\sigma_{bending\_CI}$ | 27 300 | 27 300 | 27 300 |
| $\Delta\sigma_{bending\_CE}$ | 27 300 | 27 300 | 27 300 |
| Cp $_{IT}$ | 1.00 | 1.00 | 0.98 |
| Cp C2' | 0.92 | 0.92 | 1.00 |
| Cp C3' | 1.00 | 1.00 | 0.91 |
| CpTE | 0.96 | 0.96 | 0.91 |
| Cp | 0.98 | 0.98 | 0.94 |
| αf (°) | 6.6 | 6.6 | 4.8 |
| αt (°) | 8.1 | 8.1 | 6.5 |
| $\sum_{i=1}^{Q'+M'+N'} F_{mi}(N)$ | 3427 | 3427 | 1551 |
| Cr | 0.96 | 0.96 | 0.98 |
| SL (MPa · mm) | 29 017 | 29 017 | 29 635 |
| Sc (mm²) | 8.01 | 8.01 | 3.69 |
| Se (mm²) | 16.88 | 16.88 | 8.02 |
| Ec | 0.48 | 0.48 | 0.46 |

Comparative Tests

Evaluation of the Bending Endurance Criterion and of the Size Criterion

Various control cords and cords of the prior art were simulated.

Table 3 summarizes the characteristics of the control cord C1 and of the cord of the prior art EDT (the 189.23 cord).

TABLE 3

| | Cords | EDT | C1 |
|---|---|---|---|
| TI | Q/M/N | 3/9/15 | 4/10/16 |
| | d1/d2/d3 (mm) | 0.23/0.23/0.23 | 0.23/0.23/0.23 |
| | direction for C1/pitch p1 (mm) | Z/6.5 | Z/6 |
| | direction for C2/pitch p2 (mm) | Z/12 | Z/12 |
| | direction for C3/pitch p3 (mm) | Z/16 | Z/18 |
| | I2(μm)/SI2(mm) | 14/0.13 | 9/0.09 |
| | I3(μm)/SI3(mm) | 10/0.15 | 8/0.13 |
| TE | Q'/M'/N' | 3/9/15 | 4/10/16 |
| | d1'/d2'/d3' (mm) | 0.23/0.23/0.23 | 0.23/0.23/0.23 |
| | direction for C1'/pitch p1' (mm) | Z/6.5 | Z/6 |
| | direction for C2'/pitch p2' (mm) | Z/12 | Z/12 |
| | direction for C3'/pitch p3' (mm) | Z/16 | Z/18 |
| | I2'(μm)/SI2'(mm) | 14/0.13 | 9/0.09 |
| | I3'(μm)/SI3'(mm) | 10/0.15 | 8/0.13 |
| | Direction of cord/pi/pe | S/inf/60 | S/inf/60 |
| | K | 1 | 1 |
| | L | 6 | 6 |
| | E (μm) | 0 | 0 |
| | D (mm) | 4.2 | 4.4 |
| | $\Delta\sigma_{bending\_CI}$ | 23 730 | 23 940 |
| | $\Delta\sigma_{bending\_CE}$ | 23 730 | 23 940 |
| | Cp $_{IT}$ | 0.40 | 0.40 |
| | Cp C2' | 0.48 | 0.40 |

TABLE 3-continued

| Cords | EDT | C1 |
|---|---|---|
| Cp C3' | 0.41 | 0.40 |
| CpTE | 0.41 | 0.40 |
| Cp | 0.41 | 0.40 |
| αf (°) | 34.2 | 31.9 |
| αt (°) | 8.4 | 1.5 |
| $\sum_{i=1}^{Q'+M'+N'} F_{mi}(N)$ | 3110 | 3785 |
| Cr | 0.78 | 0.79 |
| SL (MPa · mm) | 74 202 | 75 759 |
| Sc (mm²) | 7.58 | 8.57 |
| Se (mm²) | 13.78 | 15.30 |
| Ec | 0.55 | 0.56 |

Tables 2 and 3 show that the cords 50, 50' and 60 have a relatively low bending endurance criterion compared with the cord of the prior art EDT and the control cord C1 while at the same time having a sufficient size criterion. Specifically, the cords EDT and C1 have a relatively high bending endurance criterion that does not make it possible to effectively reduce the stresses in the cord during a bending stress loading. Thus the cords according to the invention have a bending endurance criterion SL≤40 000 MPa·mm low enough to remedy these drawbacks while at the same time maintaining a satisfactory size.

The invention is not limited to the above-described embodiments.

The invention claimed is:

1. A two-layer multi-strand cord comprising:
   an internal layer of the cord made up of K=1 three-layer internal strand comprising:
      an internal layer made up of Q=1, 2, 3 or 4 internal metallic threads of diameter d1;
      an intermediate layer made up of M intermediate metallic threads of diameter d2 wound around the internal layer; and
      an external layer made up of N external metallic threads of diameter d3 wound around the intermediate layer; and
   an external layer of the cord made up of L>1 three-layer external strands wound around the internal layer of the cord comprising:
      an internal layer made up of Q'=1, 2, 3 or 4 internal metallic threads of diameter d1';
      an intermediate layer made up of M' intermediate metallic threads of diameter d2' wound around the internal layer; and
      an external layer made up of N' external metallic threads of diameter d3' wound around the intermediate layer,
   wherein the cord has a bending endurance criterion SL≤40 000 MPa·mm with $$SL = \max\left(\frac{\Delta\sigma_{bending\_CI}}{Cp}; \frac{\Delta\sigma_{bending\_CE}}{C_r \times Cp}\right),$$

and a size criterion Ec≥0.46 with Ec=Sc/Se, where:
      $\Delta\sigma_{bending\_CI}$=Msteel×Max(d1; d1'; d2; d2')/2 in MPa·mm is a maximum bending stress per unit curvature seen by the internal threads of the internal and external strands or intermediate threads of the internal and external strands, $\Delta\sigma_{bending\_CE}$=Msteel×Max(d3; d3')/2 in MPa·mm is a maximum bending stress per unit curvature seen by the external metallic threads of the internal and external strands, $M_{steel}$= 210 000 MPa is the modulus of the steel, d1, d1', d2, d2', d3 and d3' are expressed in mm, $$Cp = \frac{CpIT + CpTE}{2},$$

Cp is a penetration coefficient for the cord with $Cp_{IT}$ an inter-strand penetration coefficient and Cp TE a penetration coefficient for the external strands with:

$Cp_{IT}$=0.4 when the inter-strand distance E of the external strands of the external layer E<30 μm; or $Cp_{IT}$=1.0 when E>70 μm; or $CP_{IT}$=0.015×E−0.05 when 30 μm≤E≤70 μm; and $$CpTE = \frac{CpC3' + \min(CpC2'; CpC3')}{2},$$

where CpC2' is a penetration coefficient for the intermediate layer of the external strand and CpC3' is a penetration coefficient for the external layer of the external strand such that:

Cp C2'=0.4 when the inter-thread distance I2' of the intermediate metallic threads of the intermediate layer I2'<10 μm; or Cp C2'=1.0 when I2'>40 μm; or Cp C2'=0.02×I2'+0.2 when 10 μm≤I2'≤40 μm; and Cp C3'=0.4 when the inter-thread distance I3' of the external metallic threads of the external layer I3'<10 μm; or Cp C3'=1.0 when I3'>40 μm; or Cp C3'=0.02×I3'+0.2 when 10 μm≤I3'≤40 μm;

Cr is a dimensionless performance coefficient of the cord with $$C_r = 1 - \left( \frac{\sin(\alpha_f)}{d3 \times d3'} \times \frac{\left(\sum_{i=1}^{Q'+M'+N'} F_{mi}\right) \times \sin(\alpha t)}{N \times Cste} \right)$$

where:

d3 and d3' are expressed in mm,

αf is an angle of contact between the external metallic threads of the internal strand and the external metallic threads of the external strands expressed in radians, αt is a helix angle of each external strand expressed in radians;

$$\sum_{i=1}^{Q'+M'+N'} F_{mi}$$

is a sum of forces at break for the Q'+M'+N' threads of an external strand in Newtons;

Cste=1500 N·mm$^{-2}$;

D is a diameter of the cord in mm; and

Sc is a compacted surface area in mm$^2$ with Sc=[Q×(d1/2)$^2$+M×(d2/2)$^2$+N×(d3/2)$^2$+L×(Q'×(d1'/2)$^2$+M'×(d2'/2)$^2$+N'×(d3'/2)$^2$)]×π and Se is the surface area of the cord in mm$^2$ Se=π×(D/2)$^2$.

2. The cord according to claim 1, wherein SL≤37 500 MPa·mm.

3. The cord according to claim 1, wherein SL≥25 000 MPa·mm.

4. The cord according to claim 1, wherein Ec≥0.47.

5. The cord according to claim 1, wherein Ec≤0.65.

6. The cord according to claim 1, wherein αf is greater than or equal to 0°.

7. The cord according to claim 1, wherein αf is less than or equal to 25°.

8. The cord according to claim 1, wherein αt is greater than or equal to 0°.

9. The cord according to claim 1, wherein αt is less than or equal to 20°.

10. The cord according to claim 1, wherein the external layer of the cord is desaturated so that an inter-strand distance of the external strands, defined, on a section of the cord perpendicular to the main axis of the cord, as being the shortest distance separating, on average, circular envelopes in which two adjacent external strands are inscribed, is greater than or equal to 30 μm.

11. The cord according to claim 1, wherein the external layer of each external strand is desaturated.

12. The cord according to claim 1, wherein the penetration coefficient for the cord Cp is greater than or equal to 0.60.

13. The cord according to claim 1, wherein the cord is extracted from a polymer matrix.

14. A reinforced product comprising a polymer matrix and at least one cord according to claim 1.

15. A tire comprising at least one cord according to claim 1.

* * * * *